(12) United States Patent
Simon et al.

(10) Patent No.: US 8,185,644 B2
(45) Date of Patent: May 22, 2012

(54) METHOD AND APPARATUS FOR USING SMS SHORT CODE MESSAGING TO FACILITATE THE TRANSMISSION OF A STATUS UPDATE FOR A SECURITY SYSTEM

(75) Inventors: Scott Simon, Melville, NY (US);
William R. Blum, Huntington Station, NY (US)

(73) Assignee: Honeywell International Inc., Morristown, NJ (US)

( * ) Notice: Subject to any disclaimer, the term of this patent is extended or adjusted under 35 U.S.C. 154(b) by 915 days.

(21) Appl. No.: 11/451,973

(22) Filed: Jun. 13, 2006

(65) Prior Publication Data
US 2007/0157018 A1      Jul. 5, 2007

Related U.S. Application Data

(60) Provisional application No. 60/755,627, filed on Dec. 30, 2005.

(51) Int. Cl.
*G06F 15/16* (2006.01)
*G08B 1/00* (2006.01)
*G08B 13/00* (2006.01)

(52) U.S. Cl. ......... 709/229; 709/227; 340/531; 340/541

(58) Field of Classification Search ........... 709/207–209
See application file for complete search history.

(56) References Cited

U.S. PATENT DOCUMENTS

| 6,617,969 | B2 | 9/2003 | Tu et al. |
| 6,703,930 | B2 | 3/2004 | Skinner |
| 6,717,513 | B1 | 4/2004 | Sandelman et al. |
| 6,993,658 | B1 * | 1/2006 | Engberg et al. ............ 713/185 |
| 2004/0086091 | A1 * | 5/2004 | Naidoo et al. ............ 379/37 |

(Continued)

FOREIGN PATENT DOCUMENTS

| CN | 1558612 A | 12/2004 |
| CN | 1568023 A | 1/2005 |

OTHER PUBLICATIONS

Stunder, Mark J. et al. Integration of Real-Time Data Into Building Automation Systems, Technical Report produced for the Air Conditioning and Refrigeration Technology Institute (US), Publication Date Apr. 16, 2003 (retrieved on Aug. 31, 2007). Retrieved from the Internet<URL: http://www.arti-research.org/research/completed/finalreprots/30050-final.pdf>.

(Continued)

*Primary Examiner* — Ashok Patel
*Assistant Examiner* — Evans Desrosiers
(74) *Attorney, Agent, or Firm* — Husch Blackwell LLP

(57) ABSTRACT

A notification system for receiving a request for a remote status update from a remote device is disclosed. The notification system comprises a server for relaying the request for the remote status update, an access server for receiving the relayed request for the remote status update and for determining whether a remote device is registered to receive the remote status update, a host website for allowing the remote device to be registered to receive the remote status update, and a central monitoring server for generating the remote status update based upon the request. The central monitoring server is coupled to a remote security device. The security device is configured to detect an event and transmit a message to the central monitoring server in response to the detected event. The remote status update includes information regarding the detected event.

21 Claims, 3 Drawing Sheets

U.S. PATENT DOCUMENTS

| | | | |
|---|---|---|---|
| 2005/0003834 A1* | 1/2005 | Hughes | 455/456.1 |
| 2005/0055472 A1 | 3/2005 | Krzyzanowski et al. | |
| 2005/0242944 A1 | 11/2005 | Bankert et al. | |
| 2008/0215727 A1* | 9/2008 | Denis et al. | 709/224 |

OTHER PUBLICATIONS

English translation of abstract of CN1558612 (A).
English translation of abstract of CN1568023 (A).

\* cited by examiner

METHOD AND APPARATUS FOR USING SMS SHORT CODE MESSAGING TO FACILITATE THE TRANSMISSION OF A STATUS UPDATE FOR A SECURITY SYSTEM

CROSS REFERENCE TO RELATED APPLICATION

The present application claims priority from U.S. Provisional Application No. 60/755,627 filed on Dec. 30, 2005.

BACKGROUND OF THE INVENTION

1. Field of Invention

This invention relates to a method and system for a user to receive status updates regarding their residential or commercial security systems. More particularly, the invention relates to a method and system that allows an user to send a request for a status update to a central monitoring station from a remotely located device and to receive the status update on the remotely located device.

2. Description of Related Art

Security systems, such as for both commercial and residential use, have become commonplace as people seek to protect themselves and their property. A security system includes any life, safety, and property protection system. A typical security system includes a security device located at the commercial or residential property and a central monitoring station, which is remotely located from the security device.

Typically, a user subscribes or registers the security device with one central monitoring station. The user provides the central monitoring station with information regarding the property that a security device is protecting and personal information. Each user is assigned a unique account number. These account numbers are stored in a server at the central monitoring station.

A central monitoring station includes a plurality of receivers, automation computer and a configuration computer. The receivers are used to communicate with different security devices located at a remote residence or commercial businesses. The receivers communicate with the security devices via one or more networks. The receivers receive messages via a communication link from the local individual security systems. Each receiver is connected to the automation system. The automation system is used to process the messages. The automation system is typically an automation computer. The receivers are connected to the automation computer by an automation computer port.

The central monitoring station is staffed with operators to monitor all incoming communications from the security device and to determine when an alarm is set by a monitored security system. The operator contacts emergency services such as fire or police personnel in the appropriate municipality by telephone to report the alarm.

In response to a received message, the central monitoring station processes the message and performs the necessary response. The messages from the respective security devices may include identifiers that identify the security systems. Additionally, the central monitoring station operator may notify the user of an event.

One known system to notify the user of an occurrence of an event is disclosed in U.S. Pat. No. 6,703,930, to Skinner, issued on Mar. 9, 2004, which describes a method and apparatus that automatically notifies an user of the occurrence of an event. Skinner discloses a method for detecting, routing, and presenting alerting messages for a user in response to a specific event. Skinner also provides a means for programming a specific routing priority for automatically messaging the user. Although the user is notified of an event, the user cannot trigger the notification.

However, there is still a need for users to be able to contact the central monitoring station to request the status of their security device themselves and not wait for the central monitoring station or another system to generate the notification.

BRIEF SUMMARY OF THE INVENTION

The present invention describes a solution that allows the user to be able to request an immediate status update regarding the user's security device that is monitoring a residence or commercial property. The user will then receive the requested status in a predetermined format.

Accordingly, disclosed is a notification system for receiving a request for a remote status update from a remote device. The notification system comprises a server for relaying the request for the remote status update, an access server for receiving the relayed request for the remote status update and for determining whether the remote device is registered to receive the remote status update, a host website for allowing the remote device to be registered to receive the remote status update, and a central monitoring server for generating the remote status update based upon the request. The central monitoring server is coupled to a remote security device. The security device is configured to detect an event, and transmit a message to the central monitoring server in response to the detected event. The remote status update includes information regarding the detected event. The request is an SMS.

The access server denies access to the central monitoring server, if the access server determines that the remote device is not registered, via the host website, to receive the remote status update. The access server can transmit contact information for the host website to the remote device to enable registration, if the remote device is denied access.

The host website allows a user to select a format for the status update and to select at least one event from a plurality of events to receive the remote status update.

Also disclosed is a method for registering a remote device to receive a remote status update regarding a remotely located security device. The method comprises the steps of inputting a unique contact identifier into a host website for the remote device, selecting a format for the remote status update via the host website, and selecting at least one event from a list of a plurality of events for receiving the remote status update.

A corresponding method for requesting a remote update is also disclosed.

BRIEF DESCRIPTION OF THE DRAWINGS

These and other features, benefits and advantages of the present invention will become apparent by reference to the following text and figures, with like reference numbers referring to like elements across the views, wherein.

DETAILED DESCRIPTION OF THE INVENTION

The present invention includes a method and system for allowing an user to register a remote device with a central monitoring station, via a host website, to receive instantaneous remote status updates from the central monitoring station when an user sends a predetermined short code message (hereinafter "SMS") to the central monitoring station.

Figure 1:
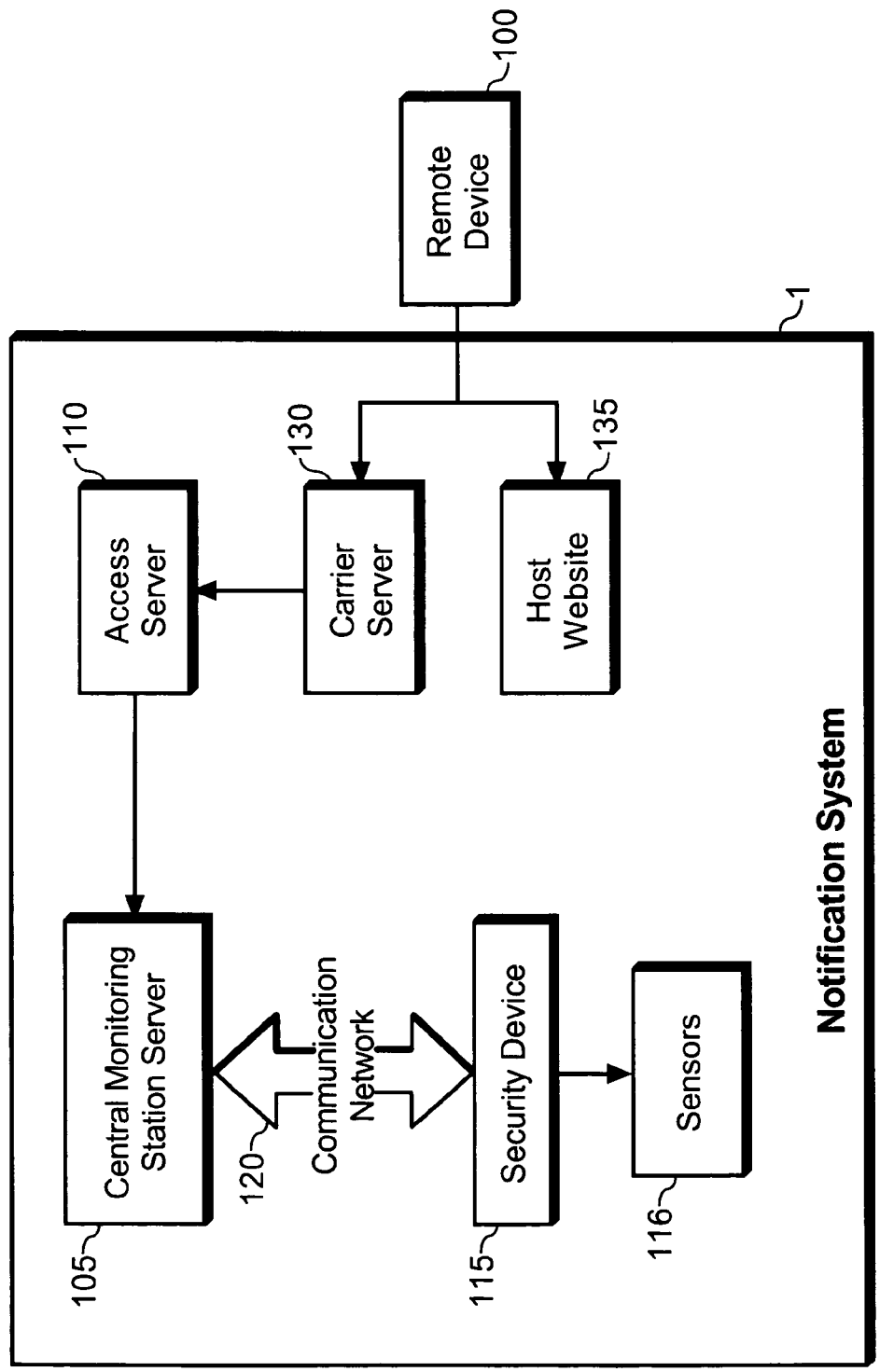
FIG. 1 is a schematic diagram of a system in accordance with an embodiment of the invention.

FIG. 1 is a schematic diagram that illustrates the notification system 1 according to an embodiment of the invention. The notification system 1 is configured to instantaneously transmit a remote status update to the remote device 100. The notification system 1 includes an access server 105, a security device 115, where the security device includes at least one sensor 116, central monitoring station server 105, and a communications network 120 to allow communication between the security device 115 and the central monitoring station server 105. The notification system 1 further includes a carrier (SMSC) 130 that acts as an intermediary from the remote device 100 to the access server 110 and relays the SMS to the access server 110. The notification system 1 also includes a host website 135 for allowing the user to register the remote device 100 to receive remote status updates.

The sensor 116 is configured to detect the occurrence of an event, such as fire, carbon monoxide, burglary, motion, etc. The sensor 116 reports the detection of the event to the security device 115 that relays the information to the central monitoring station server 105 via the communication network 120. Typically, the central monitoring station server 105 is an automation system.

The access server 110 allows the user access to information that is received and stored at the central monitoring station server 105. The user will send a predefined message to the access server 110 to generate a request for a remote status update from a remote device 100. If the user's remote device 100 is registered as enabling remote status updates, the access server 110 will allow the request to proceed to the central monitoring station server 105. If the user's remote device 100 is not registered for remote status updates, the access server 110 will deny the request and prevent access to central monitoring station server 105. In an embodiment of the invention, the access server 110 will prompt the user to register the remote device 100 with a host website 135. Alternatively, the access server 105 will just deny the request without any prompts.

The host website 135 enables a user to register any remote device 100 to receive remote status updates. The remote device 100 can be any electronic device capable of sending or receiving a SMS. For example, the remote device 100 can be a portable device such as a cellular telephone, a pager, PDA or a laptop. Alternatively, the remote device 100 can be a desktop computer, a telephone, or personal digital assistant. However, the remote device 100 must be capable of sending a SMS.

Figure 2:
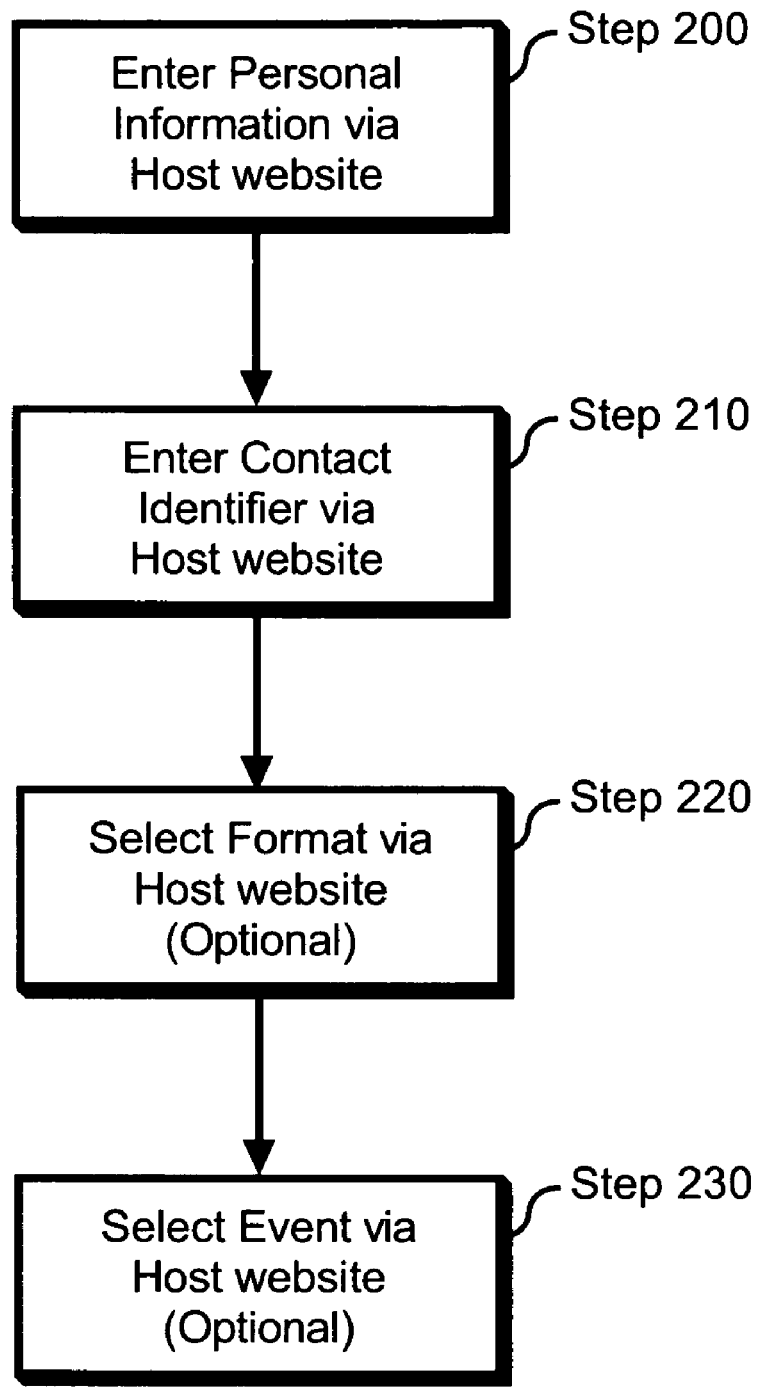
FIG. 2 is a flow diagram which depicts the user registering a remote device with a central monitoring station.

FIG. 2 illustrates a method of registering a remote device 100 with the host website 135. The user must have access to a communication network, such as an Internet or Intranet to access the host website 135. The user can potentially obtain Internet access via a modem, satellite, or other well-known means.

The host website 135 will prompt the user to input various types of personal information, at step 200. This information can include a name, a billing address, an account number and an address of a protected residential or commercial property. The host website 135 will further prompt the user to enter a unique contact identifier for the remote device 100, at step 210. The unique contact identifier is the means in which the central monitoring station server 105 will be able to contact the remote device 100. For example, for a cellular telephone, the unique contact identifier would be the cellular telephone number. However, for a personal computer or a laptop, the unique contact identifier might be an IP address or an email account.

In one illustrative embodiment, the host website 135 will also prompt the user to enter information regarding the format for the status update, at step 220. The status update can be in any communication form such as audio, text, or video. Alternatively, this step can be omitted and the particular format will be based on the specific SMS transmitted by the remote device 100, as will be described later.

Additionally, the user can select one or more events that will be included in the remote status, at step 230. There are three categories of events, an emergency event, a status event and a functional event. An emergency event is one that can result in a loss of life or property and is detected by one of the sensors 116 attached to the security device 115, and can include detection of fire (smoke), carbon monoxide, or burglary (motion). A status event can include arm or disarm of the security device 115.

Additionally, a status event can include a video image of the protected property when no "emergency event" or functional event occurs. This feature is particularly useful if the user just wants to view the property without the occurrence of an emergency or malfunction. In one embodiment, the property will have a plurality of video cameras or devices. The plurality of video cameras will be used in conjunction with the security device 115. Typically, each video camera will be coupled to the security device 115 and positioned in a security zone; one video camera is associated with the zone. The video camera will transmit a video signal to the security device 115. The security device 115 will relay the video signal or image to the central monitoring station server 105. The user can request, via the remote device 100 that the central monitoring station server 105 transmits a video update for one of the security zones. Specifically, the user can send a predefined SMS to the access server 110. This predefined SMS can represent a specific zone that the user wants to view, as well as the specific video format that the video image should be transmitted.

A functional event refers to a function or operation of the security device 115. Typically, a functional event will be a malfunction with the security device 115 or sensor 116, e.g., a power problem, communication line problem, battery problem, etc.

In one embodiment, the user will select or enable a particular event using this host website 135, at step 230. For example, the website can include a check box form that includes all of the events available for remote status update. The user will select a particular event by placing a check in the appropriate check box. Alternatively, the system can include a default list of events that a user will receive a remote status update. The default list can be determined based upon the mostly likely events that a user would like to receive remote status updates. Typically, this default list will include all emergency events and any functional event that would cause the security device 115 to be unable to detect an emergency event.

Additionally, the remote status update can include information regarding the location of the event, such as a zone. The location of the event is based upon the location of the sensor 116 that detected that event. Typically, the location of the event will be important for an emergency event. The user can specifically request that the status update include the location. Alternatively, the location information can be automatically included in a default status update.

Once the remote device 100 is registered with the host website 135, the remote device 100 is enabled to request a remote status update.

Figure 3:
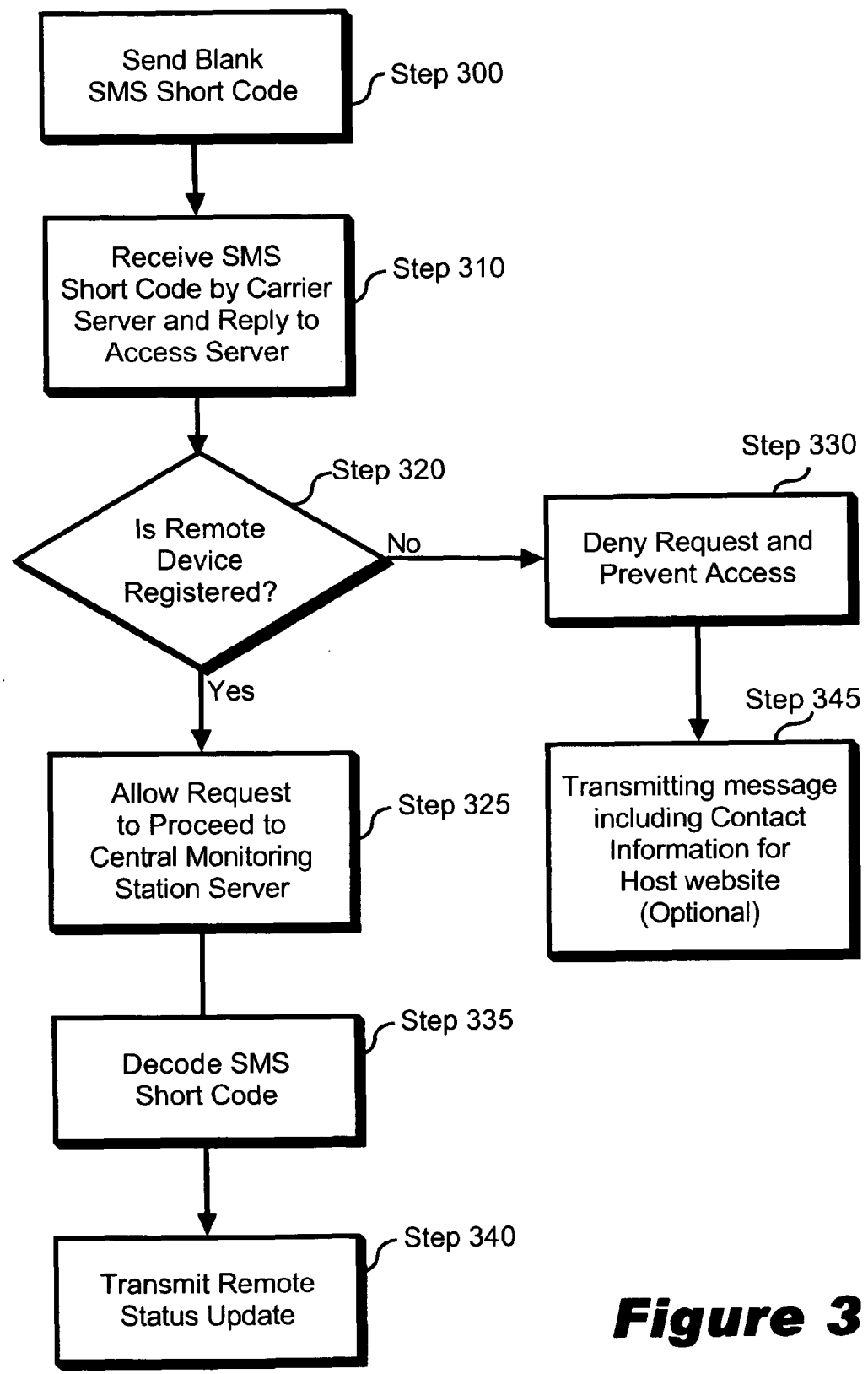
FIG. 3 is a flow diagram, which depicts a method of requesting a remote status update and receiving the requested remote status update.

FIG. 3 illustrates the method of requesting a remote status update from the central monitoring station server 105 using a remote device 100. The user sends a blank text message, at step 300, requesting a remote status update. In a preferred embodiment, the text message will be an SMS. An SMS is a service or type of messaging available on most digital mobile phones that permit the sending of short messages (also known as text messages, messages, or more colloquially SMSes, texts or even txts) between mobile phones, other handheld devices and even POTS telephones. An SMS is typically carrier specific, meaning that there is a different SMS for each different carrier. The SMS is delievered or relayed by a Short Message Service Center (SMSC) or carrier server 130, i.e., server. The SMSC or carrier server 130 is a network element in the mobile telephone network which delivers SMS messages. When a user transmits a text message (SMS message) to another user, the phone actually sends the message to the SMSC. The SMSC stores the message and then delivers it to the destination user when they are available. However, any type of message can be sent and the invention is not limited to a SMS. For example, a email can be the request for a status update.

The SMS can represent a unique identifier for the access server 110 or company telephone number for the central monitoring station. The SMS is a specfic predefined length. In an embodiment, the SMS is a unique number used to identify the location where the message should be sent. Specifically, a security system company would have to register this unique number with one or more cellular phone carriers. Once registered the SMSC or carrier server 130 will know where to forward or relay the SMS.

Alternatively, the SMS can represent a specific function that the user would like the security company to provide. The SMS could mean that the user would like the central monitoring station server 105 to send a remote status update as a text message or a video message. For example, the SMS "84336" could mean that the user would like to receive a video status update on the remote device 100. Once again, the specific SMS would have to be registered with the SMSC or carrier server 130. In one embodiment, multiple SMSs will be registered with the SMSC or carrier server 130, each specific SMS will represent a special function that the user is requesting.

After the user enters the SMS, at step 300, the message will be transmitted to the SMSC or carrier server 130, at step 310, and then the message will be relayed to the access server 110. Upon receipt of the SMS, the access server 110 will determine if the remote device 100 that transmitted the SMS is registered or enabled to receive remote status updates, at step 320.

This determination is based upon a comparison between a received identifier for the remote device 100 and a registered identifier registered using the host website 135. The access server 110 obtains the list of registered identified from the host website 135. The received identifier is a unique number that identifies the remote device 100. In the preferred embodiment, this identifier is a cellular telephone number. This number can be found in a header section of all text messages. The access server 110 compares the number with the number registered, in advance, by the user.

If there is a match between the two numbers, e.g., identical received identifier and registered identifier, access server 110 will determine that the user's remote device 100 is registered for enabling remote status updates, and the access server 105 will allow the request to proceed to the central monitoring station server 105, at step 325. If there is not a match, then the user's remote device 100 is not registered to receive remote status updates, and the access server 105 will deny the request and prevent access to central monitoring station server, at step 330.

As stated above, if the remote device 100 is registered, the access server 110 will forward the text message to the central monitoring station server 105. In response the central monitoring station server 105 will decode the SMS, at step 335. In other words, the central monitoring station server 105 will look up or match the received SMS or with a predefined list of short codes in a short code table. The central monitoring station server 105 will then provide to the remote device 100 the request information in the requested format, at step 340.

For example, as stated above, the SMS for video message is "84336". If the central monitoring station server 105 receives this short code, the central monitoring station server 105 will first match the short code with the predefined list in the short code table and then transit the status update to the remote device 100 in a video format.

The central monitoring station server 105 can send a video image to the remote device 100 using a predefined video format. The specific format will be determined by the incoming SMS from the remote device 100. For example, the video can be sent using a Multimedia Messaging Service (MMS). The multimedia messages can include graphics, video and audio clips. In other words, the user can input a specific SMS, i.e., to a specific number that is designated for multimedia messages and the central monitoring station server 105 will response by sending an MMS. The specific type of MMS, i.e., graphics, video and audio can be customized for a specific individual user using the host website. Additionally, during this customization, the user can specify a different location for the MMS to be sent.

On the other hand, if, at step 330, the access server 110 denies access to the central monitoring station server 105 because the remote device 100 is not registered to receive remote status updates, then the access server 110 can transmit a deny message to the remote device 100. Alternatively, as shown in FIG. 3, at step 345, the access server 110 will transmit a text message that includes the host website's address, such that the user can register the remote device 100 with the host website 135, using the registration process illustrated in FIG. 2. Once registered, the user will re-transmit the SMS to the access server 110 via the SMSC or carrier server 130.

In another embodiment of the invention, a specific SMS can be designated to remotely modify the status of the security device 115. For example, the user can remotely arm or disarm the security device. According to this embodiment, the user would input the designated SMS into the remote device 100 and send the SMS. If the remote device is registered for remote status update, then the access server 110 will forward the SMS, to the central monitoring station server 105. Alternatively, remote access e.g., remote arming, can be a separate service from the remote status update, requiring a separate registration. The registration process can be identical to the registration process for the remote status update. The central monitoring station server 105 will decode the SMS, in a similar manner as described above for the remote status update, i.e., step 335. However, instead of providing the remote device 100 with a remote update, the central monitoring station server 105 will generate and transmit a control signal to the security device 115 via the communication network 120. The control signal will correspond to the specific SMS.

In another embodiment, a specific SMS can be designated for generating an alarm at the location of the security device 115.

Similar to the remote status update, if the access server 110 determines that the remote device 100 is not registered, access to the central monitoring station server 105 will be denied.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

The invention claimed is:

1. A notification system for receiving a request message for a remote status update under a short message service (SMS) format from a remote device comprising:
    (a) a central monitoring server that registers a plurality of SMS message destination addresses for respective users of security devices who subscribe to receive security device updates from the central monitoring server;
    (b) an access server that receives the request message under the SMS format from said remote device, the access server determines whether said remote device is registered to submit request messages to the central monitoring server from a header of the request message and denies the request message and prevents access to the central monitoring server when the remote device is not registered wherein the request message includes a blank text message portion and wherein the request message is a unique number that identifies one of the plurality of SMS message destinations registered by the central monitoring server;
    (c) a host website for allowing said remote device to be registered to receive said remote status update; and
    (d) wherein the central monitoring server provides a plurality of predetermined functions wherein at least one of the plurality of functions is associated with each of the plurality of message destinations, where the request message from a registered remote device is delivered to one of the plurality of messages destinations identified by the unique number and the central monitoring server generates a response in accordance with the identified predetermined function of the message destination based upon receipt of the request message, said central monitoring server is coupled to a remote security device of a subscribing user of the remote device wherein said security device is configured to detect an event, said security device transmits a message to said central monitoring server in response to the detected event, and wherein said central monitoring server sends a remote status update to the remote device in response to the request message, where the status update includes information regarding said detected event in accordance with at least one of the plurality of predetermined functions identified by the request message.

2. The system according to claim 1, wherein said access server denies said remote device access to the central monitoring server if said access server determines that said remote device is not registered, via the host website, to receive said remote status update.

3. The system according to claim 2, wherein when said access server denies the remote device access to the central monitoring server, said access server transmits contact information for the host website to the remote device to enable registration.

4. The system according to claim 1, wherein said short code message requests a specific format for the remote status update.

5. The system according to claim 4, wherein said specific format includes one or more of text, video and voice message.

6. The system according to claim 1, wherein said host website allows a user to select a format for said status update and to select at least one event from a plurality of events to receive said remote status update.

7. The system according to claim 6, wherein said plurality of events includes emergency events, status events, and functional events.

8. A method of requesting a remote status update comprising the steps of:
    (a) a central monitoring server registering a plurality of SMS (SMS) message destination addresses for respective users who subscribe to receive security device updates from the central monitoring server;
    (b) an access server receiving a short code message defined by a numeric sequence and a blank text message portion under a short message service (SMS) format from a remote device indicating a request where a content of the short code message is a unique number of a defined predetermined length identifying one of the plurality of SMS message destinations;
    (c) determining if said remote device is registered with the central monitoring server for receiving said remote status update from a header of the short code message;
    (d) allowing access to the central monitoring server when said remote device is registered and denying and preventing access to the central monitoring server upon determining that said remove device is not registered;
    (e) the central monitoring server providing a plurality of predetermined functions where each of the plurality of predetermined functions is associated with at least one of the SMS message destinations and where at least one of the plurality of functions is identified by a content of the short code message;
    (f) generating a response in accordance with the function identified by the received short code message; and
    (g) transmitting said generated response from said central monitoring server to said remote device in response to said short code message, said generated response is based upon information received from a security device of a subscribing user of the remote device remotely located and configured to detect a plurality of events.

9. The method of claim 8, wherein the step of determining if said remote device is registered further comprises the step of matching a received unique identifier with a plurality of registered identifiers.

10. The method of claim 8, further comprising the steps of:
    (a) selecting a specific format for said status update message; and
    (b) selecting at least one event from a list of a plurality of events for receiving the remote status update, wherein said selecting steps are performed using the host website.

11. The method of claim 10, wherein said remote status update including only said selected at least one event is transmitted in said selected specific format.

12. The method of claim 8, wherein a format of said remote status update is based upon said short code message.

13. The method of claim 12, further comprising the step of matching the received short code message with a predefined list of short code messages to detelinine the format for said remote status update.

14. The method of claim 8, further comprising the step of denying said remote device access to the central monitoring server if said determining step determines that said remote device is not registered, via the host website, to receive said remote status update.

15. The method of claim 14, further comprising the step of transmitting contact information for the host website to the remote device to enable registration.

16. The method as in claim 8 further comprising registering the remote device to receive the remote status update regarding the remotely located security device, said registering further comprising the steps of:
   (a) inputting a unique contact identifier into a host website for said remote device;
   (b) selecting a format for said remote status update via said host website; and
   (c) selecting at least one event from a list of a plurality of events for receiving said remote status update via said host website.

17. The notification system of claim 1, wherein said server includes a means for recognizing a short code message from said remote device as being the request.

18. A remote management system for controlling and managing a security device comprising:
   (a) a central monitoring server that registers a plurality of SMS message destination addresses for respective users of security devices who subscribe to receive security device updates from the central monitoring server;
   (b) a remote device that issues a designated management message including a blank text message portion and a numeric sequence portion under a short messaging service (SMS) format corresponding to a management command, a content of said management message is a unique number of a defined predetermined length that identifies one of the plurality of SMS message destinations;
   (c) an access server that receives a content of said designated management message and determines whether said remote device is registered with the central monitoring server to issue said designated management message from a header of said management message and denies the request message and prevent access to the central monitoring server upon determining that said remove device is not registered;
   (d) a host website that allows said remote device to be registered to issue said designated management message; and
   (e) a central monitoring server, said central monitoring server providing a plurality of predetermined functions, where at least one of the plurality is associated with each of the plurality of SMS destinations and where at least one of the plurality of predetermined functions and SMS destinations is identified by the unique identifier, the central monitoring server generates a control signal in accordance with the function identified by the received designated management message and transmits said control signal to said security device of a subscribing user of said remote device based upon said designated management message, wherein said security device performs a function based on said control signal.

19. The remote management system according to claim 18, wherein said management command includes a command to arm or disarm said security device.

20. The remote management system according to claim 18, wherein said management command includes a command for said security device to generate an alarm.

21. The remote management system according to claim 18, wherein said management command includes a command to receive a remote status update.

* * * * *